United States Patent [19]

Druffel et al.

[11] Patent Number: 5,778,625
[45] Date of Patent: Jul. 14, 1998

[54] RECESSED LIGHTING FIXTURE AND METHOD OF INSTALLING

[75] Inventors: James B. Druffel, Solvang; Larry L. Routh, Santa Barbara, both of Calif.

[73] Assignee: Bega/US, Inc., Carpenteria, Calif.

[21] Appl. No.: 731,382

[22] Filed: Oct. 11, 1996

Related U.S. Application Data

[60] Provisional application No. 60/005,163 Oct. 13, 1995.

[51] Int. Cl.⁶ .................................................. H02G 3/08
[52] U.S. Cl. ............................ 52/577; 52/28; 52/220.1; 52/576; 52/699; 52/742.14; 264/35; 349/35; 349/177; 220/3.4; 174/48
[58] Field of Search ........................... 52/28, 220.1, 576, 52/577, 699, 742.14; 264/35; 249/35, 177; 220/3.4, 327; 174/48

[56] References Cited

U.S. PATENT DOCUMENTS

| | | |
|---|---|---|
| 1,572,214 | 2/1926 | McEwing et al. |
| 1,574,483 | 2/1926 | Hirshstein ................ 249/35 X |
| 2,633,263 | 3/1953 | Stonaker . |
| 2,652,168 | 9/1953 | Nelson et al. . |
| 2,691,718 | 10/1954 | Bowers . |
| 3,015,408 | 1/1962 | Campbell et al. ........ 220/3.4 |
| 3,518,331 | 6/1970 | Marin ........................ 264/35 |
| 4,170,853 | 10/1979 | Kohaut . |
| 4,619,087 | 10/1986 | Harbeke ................... 52/699 X |
| 4,907,361 | 3/1990 | Villard . |
| 5,160,202 | 11/1992 | Légaré . |
| 5,359,152 | 10/1994 | Hone-Lin ............... 220/3.4 X |

FOREIGN PATENT DOCUMENTS 135297  6/1933  Germany ................ 220/3.4

Primary Examiner—Robert Canfield
Attorney, Agent, or Firm—Rothwell, Figg, Ernst & Kurz

[57] ABSTRACT

A recessed lighting fixture includes a back housing which is secured to a form board for receiving poured concrete such that the concrete sets around the housing to form a recessed area in a concrete structure. The form board is joined to a stiffener plate to support the housing under the force of the concrete. The form board and stiffener plate are removed from the back housing and the internal components of the lighting fixture are disposed in and secured to the interior of the back housing to form a recessed lighting fixture which is flush with the surface of the structure, for example a concrete wall. The internal components of the fixture may subsequently be removed and replaced should the need arise as only the back housing is fixed to the concrete wall.

9 Claims, 2 Drawing Sheets

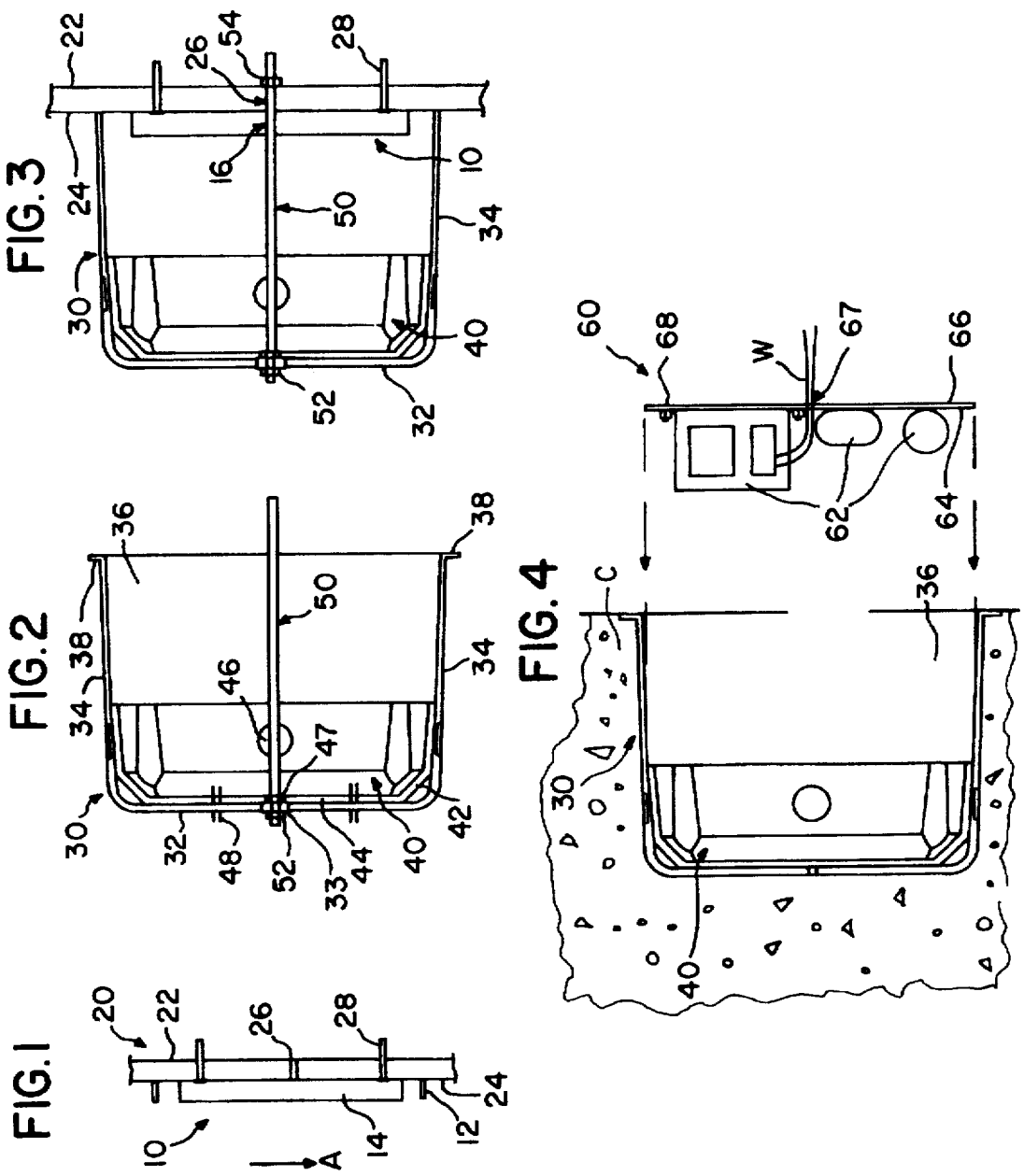

RECESSED LIGHTING FIXTURE AND METHOD OF INSTALLING

This application claims the benefit of U.S. Provisional application Ser. No. 60/005163 filed Oct. 13, 1995.

BACKGROUND OF THE INVENTION

1. Field of the Invention

The present invention relates to a lighting fixture and, more particularly, to a recessed lighting fixture.

2. Description of Relevant Art

Electrical fixtures which are recessed within a wall, floor, ceiling or other structure are known in the art. Such recessed fixtures, for example lighting fixtures or electrical outlet boxes, may be used in a variety of applications. For example, lighting fixtures may be recessed in a floor or wall to provide lighting along a floor or walkway. A significant benefit of such recessed light fixtures, i.e., the fixture's outer surface is flush with the exterior surface of the wall, is that lighting (or another desired function) is provided without reducing the area adjacent the wall typically used for walking. Thus, such fixtures are well-suited for use in illuminating a fire exit path or like escape route.

One manner in which prior art lighting fixtures are mounted in a concrete wall or other concrete structure is to fasten a base housing to the form board which is conventionally used to delineate the area which receives the poured concrete. The housing is temporarily fastened to the form board and concrete is poured around and encloses the fixture. The form board then is removed and the fixture secured to the base housing and closed by a cover or other means.

Several problems exist with prior art recessed lighting fixtures, one of which is the tendency for the base housing (which is secured to the form board) to be moved or jarred when concrete is poured around the housing. That is, the base housing includes a surface which is contacted by the concrete when it is poured adjacent the form board, often resulting in faulty positioning or misalignment of the housing relative to the resulting concrete structure. A larger base housing includes greater surface area which is contacted by the concrete and, consequently, is even more susceptible to being improperly positioned. Further, the base housing typically is formed of plastic material which may be distorted or otherwise adversely affected by the force of the heavy concrete during pouring or packing of same around the housing. This problem is aggravated when the form board does not adequately support the base housing so that the latter withstands pouring and packing of the concrete. Such problems may lead to failure of the material forming the housing as well as improper positioning of the housing relative to the concrete structure, which in turn may allow the elements to enter the interior of the housing and fixture and have well known harmful or corrosive effects on the components.

Accordingly, there is a need in the art for an improved recessed lighting fixture which is free of the problems of the prior art.

SUMMARY OF THE INVENTION

The present invention provides a recessed lighting fixture which includes a back housing for being placed in a structure, such as a poured concrete wall. The base housing is cup-shaped with an open end and is attached to a form board for the concrete such that the open end of the housing is closed off by the form board. A stiffener plate is attached to the form board to provide the board with increased strength and rigidity for supporting the base housing (which may be a relatively heavy component). The base housing is secured to the form board via a threaded rod and a pair of nuts. The base housing is easily removed from the form board by disengaging the rod from the housing. As a single opening in the form board secures the rod and base housing thereto, no notches or cuts need to be specially formed in the board. This provides much easier installation than prior art apparatus.

The base housing is preferably formed of a plastic material, for example, ABS (acrylonitrile-butadiene-styrene). The wiring or like electrical components are covered by metal parts (according to UL requirements) which may be damaged or corroded upon contact with the elements. The plastic housing isolates the interior of the housing and fixture from the elements and protects the metal components from corrosion caused by same, salt or other caustic material present in concrete. Also, as only the base housing is secured to the form board, installation and assembly of the device may be performed quickly and easily. After the concrete has set, the base housing presents an open compartment which receives the various components of the lighting fixture, for example, the ballast cover plate, the fixture housing, etc. Consequently, should the internal components of the fixture become damaged by wear, vandalism, etc., they can be completely or partially removed from the base housing (which remains in the concrete) and replaced with new components. This is in contrast to prior art devices which had to be removed entirely if damaged or corroded which removal resulted in a hole in the concrete structure.

Other features, benefits and advantages of the invention will be apparent from the following detailed description of preferred embodiments thereof taken in conjunction with the accompanying drawing Figures, wherein:

BRIEF DESCRIPTION OF THE DRAWINGS

FIG. 1 is a side elevation view of a stiffener plate and form board according to a preferred embodiment of the present invention;

FIG. 2 is a side elevation view of a base housing according to a preferred embodiment of the present invention;

FIG. 3 is a side elevation view of the base housing of FIG. 2 and the stiffener plate and form board of FIG. 1;

FIG. 4 is a side elevation view of the base housing shown in FIG. 2 embedded in a concrete structure and a ballast plate;

DETAILED DESCRIPTION OF PREFERRED EMBODIMENTS

Figure 6:
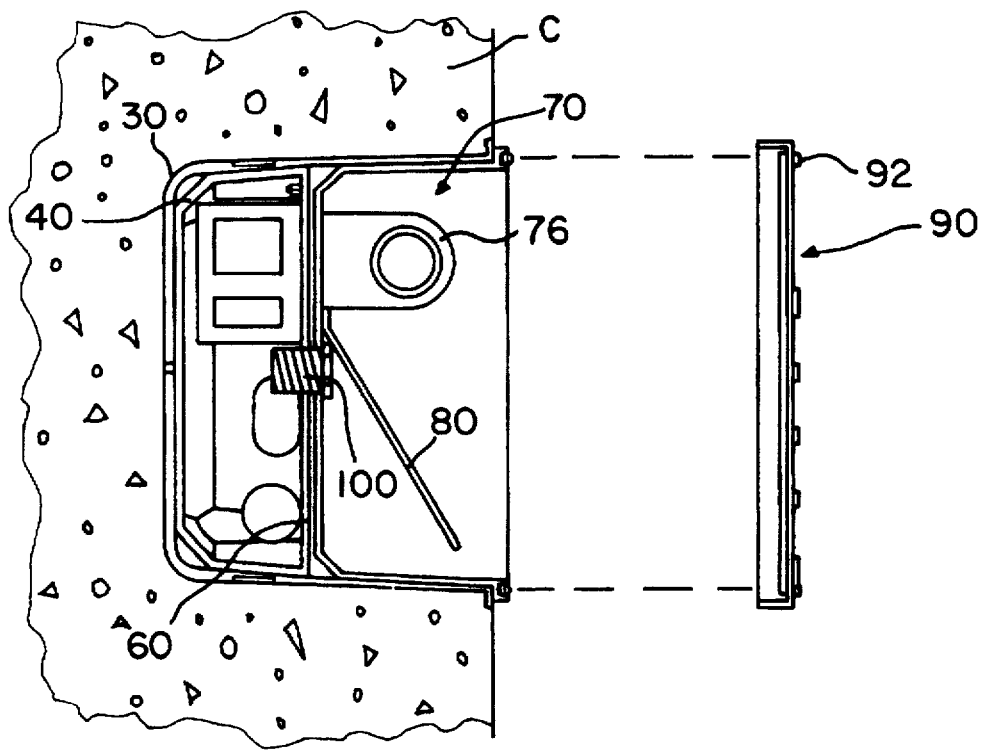
FIG. 6 is a side elevation view of the base housing, ballast plate and fixture housing of FIG. 5 in assembled condition.

A recessed lighting fixture according to the a preferred embodiment of the present invention is shown in its assembled form in FIG. 6 (with the lighting cover not attached). The Figures show in step-by-step fashion the manner in which the lighting fixture of the invention is assembled in a concrete wall or other concrete structure C. Although described below in connection with a concrete structure, it will be appreciated that other structural members or material may be utilized in connection with the present invention. Further, while the preferred embodiment of the present invention is a recessed lighting fixture, which is described in detail below, persons skilled in the art will recognize that the invention may be utilized to recess or embed various other fixtures, electrical or non-electrical, in walls, floors or other structural elements. As such, the following detailed description of a lighting fixture is not intended to limit the invention but is made only for the sake of clarity of description.

Referring to FIG. 1, reference numeral 10 indicates a stiffener plate according to the present invention and reference numeral 20 indicates a concrete forming board the use of which is known in the art. The forming board 20 is used to delineate a specific area which will receive the poured concrete to form a concrete wall, floor, or other structure. The stiffener plate 10 includes an outer flange portion or portions 12 and a center portion 14. The stiffener member preferably is made of sheet metal with a reinforced center portion 14 to provide the member with increased strength and rigidity. Of course, other sturdy materials could be used as well. The stiffener plate 10 is secured to the inner surface 24 of form board 20 by nails or other suitable fasteners 28. As will be described below, the stiffener board and the stiffener member 10 and form board 20 are joined to form a rigid element which receives and supports the back housing of the invention.

FIG. 2 depicts a back or base housing member 30 in the form of a cup-shaped element with a bottom wall 32 and an open end opposite the bottom wall. A plurality of sidewalls 34 extend from the bottom wall 32 toward the open end and terminate in a flange portion 38. In a preferred embodiment, the back housing 30 is rectangular in plan view and thus includes four sidewalls 34. However, the back housing 30 may take any shape, for example, circular, square, triangular, etc., and include less or more than four sidewalls. The bottom wall 32 of housing 30 includes an opening 33 for securing the housing to the stiffener member 10 and form board 20, as will be described in detail below. Preferably, the back housing 30 is formed of a sturdy plastic or polymeric material, for example, ABS; however, other suitable materials may be used as well.

The back housing 30 has securely positioned therein ballast housing 40. Ballast housing 40 has an exterior 42 which generally conforms to the interior of the back housing 30 and an end surface 44 which abuts the interior of bottom wall 32 of housing 30. The ballast housing 40 includes openings 46 for receiving wiring from a power supply (not shown) and may have openings indicated schematically at 48 which receive fasteners to fix the ballast housing to the back housing 30. The back housing 30 and ballast housing 40 preferably are secured together to form a single component which may be attached to the stiffener plate 10 and form board 20. The ballast housing 40 is provided with an opening 47 located in end surface 44 which is aligned with opening 33 of back housing bottom wall 32.

FIG. 3 shows the manner in which the back housing is attached to the stiffener member 10 and form board 20. An elongated threaded rod 50 includes opposite ends which receive first and second nuts 52, 54. As seen in FIG. 2, the threaded rod 50 is passed through the opening 33 in bottom wall 32 of back housing 30 as well as opening 47 in end surface 44 of ballast housing 40 and the nut 52 is threaded onto one end of the rod 50 (at the left in FIG. 2) so as to fix said end of the rod to the bottom wall 32 of housing 30. The form board 20 includes a pilot opening 26 positioned therein for receiving the threaded rod 50. The stiffener member 10 includes an opening 16 which is aligned with the opening 26 in form board 20 upon securing stiffener member 10 to the form board. Once a first end of the threaded rod 50 has been attached to back housing 30, the open end of the housing is moved into face-to-face engagement with the inner surface 24 of form board 20 with the opposite end of threaded rod 50 passing through the respective openings 16, 26 in stiffener member 10 and form board 20 (as seen in FIG. 3). A second nut 54 is threaded over the opposite end of the threaded rod 50 to securely lock the base housing 30 to the form board 20, the form board 20 being structurally supported by stiffener member 10 as described above. The stiffener plate 10 preferably has an arrow or other means for indicating the position of the stiffener when it is properly oriented and secured to the form board 20. In the depicted embodiment which disposed in a concrete wall, the indicating means points downward in the direction of arrow A.

With the back housing 30 secured to form board 20 as seen in FIG. 3, the interior 36 of the housing is substantially isolated from the exterior of the housing. The concrete C is poured so as to pass over and around the housing 30 until the housing is completely covered. The stiffener member 10 of the invention provides added strength and rigidity to the form board 20 so as to support the base housing 30 against deformation under the weight of the concrete. As seen in FIG. 3, the flange portion 12 of stiffener member 10 abuts the interior of the sidewalls 34 of back housing 30 to support the sidewalls against the inward force applied by the concrete. Thus, the tendency of the sidewalls to deform inwardly under force of the concrete is prevented or greatly reduced relative to the prior art devices discussed above. The concrete C is poured over and packed around the back housing 30 but such pouring and packing does not deform the housing 30 or cause the housing to become misaligned relative to form board 20 due to its being securely fastened thereto. Although in operation it is desirable to pour the concrete around the back housing 30 as opposed to directly against the housing 30, in practice the concrete often contacts the housing and may result in the aforesaid problems relating to deformation of the housing or shifting of the housing relative to the form boards. The present invention, however, overcomes such problems and thus is not adversely affected should concrete C be poured directly against the surface of housing 30.

Once the concrete C has set, the form board 20 and stiffener plate 10 are removed from the back housing 30 by removing the nut 54 which allows the form board 20 and stiffener plate 10 to be removed by passing the rod 50 through the aligned openings 16, 26 in members 10 and 20. Next, the threaded rod 50 is rotated to release same from the aligned threaded openings 47, 33 in the ballast housing end surface 44 and back housing end wall 32. Upon removal of the threaded rod 50 the back housing 30 presents a recessed compartment which is open to receive ballast plate 60 as seen in FIG. 4.

Figure 5:
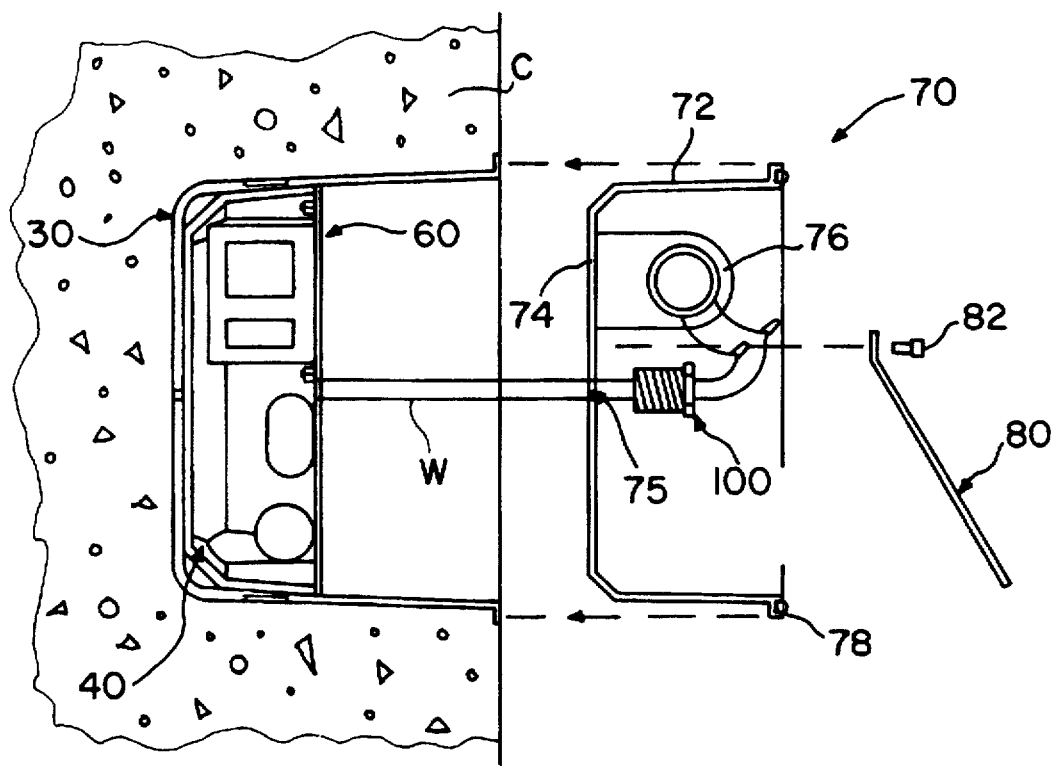
FIG. 5 is a side elevation view of the base housing and ballast plate of FIG. 4 assembled together along with a fixture housing.

The ballast plate 60 may be conventional and include various electrical components 62 which suitably condition the current received from a power source before the current is passed to the lighting fixture. The ballast plate 60 includes an under surface 64 to which components 62 are secured, an opposite surface 66 and an opening 67. The plate 60 may be secured to the ballast housing 40 via fastener 68 or any other suitable connecting means. FIG. 5 shows the ballast plate 60 secured to the ballast housing 40 such that both elements are disposed in the lower portion of back housing 30 (i.e., to the left in FIGS. 4, 5 and 6). Once the ballast plate 60 is so secured, a lighting fixture 70 is received in the back housing 30. The lighting fixture 70 may be formed of any suitable material and preferably includes a housing with an exterior 72 which generally conforms to the interior of the back housing 30 and an end surface 74 which abuts the surface 66 of ballast plate 60 when secured thereto (FIG. 6). The fixture housing 70 includes a component 76 for receiving a suitable light source as well as an outer flange and gasket 78 which is received against the flange 38 of back housing 30. The end surface 74 of fixture housing 70 includes a threaded opening 75 which receives a threaded pipe member 100 that passes through the opening 75 and is received in the corresponding threaded opening 67 disposed in ballast plate 60.

Wiring W extends from a power supply (not shown) and passes from the ballast 60 through ballast opening 67 (FIG. 4), opening 75 in fixture housing 70, and through pipe member 100 where it is attached by suitable means to lighting fixture 76. A reflector 80 is secured by a fastening means 82 to the interior of the fixture housing 70 for purposes well known in the art. Once the wiring W has been passed through the end surface 74 of fixture housing 70 and pipe member 100, the fixture housing 70 is moved into the interior 36 of back housing 30 until it engages the ballast plate 60. The threaded pipe member 100 is engaged in the threaded opening 75 of fixture housing 70 and threaded opening 67 of ballast plate 60 to securely lock the components together as seen in FIG. 6. A cover or face plate 90 is secured via fasteners 92 to the open end of the recessed housing to close off the interior of the housing from the elements. Also, silicone or other suitable sealing means preferably is provided between or at the junction of flange 38 of back housing 30 and flange 78 of fixture housing 70 for reducing the likelihood of moisture, dirt or other elements passing into the housing interior.

It will be recognized that the above-described recessed lighting fixture is but one possible embodiment of the present invention. For example, the invention can be carried out without using a stiffener plate provided the form board is sufficiently strong to adequately support the back housing during pouring and packing of the concrete. Also, a person skilled in the art will recognize that the invention may be utilized to place various fixtures, lighting fixtures being but one example, in both concrete and non-concrete structures, including walls, floors, ceilings, beams, etc. It is further apparent that the present invention provides a greatly improved and easy-to-use recessed lighting fixture which may be assembled in a concrete structure without the problems present in prior art devices. The resulting recessed lighting fixture is adequately isolated from the elements and thus will not suffer from corrosive or other adverse effects caused by same or the composition of the concrete or other building material. In addition, the back housing is the only member fixed in the concrete and thus permits removal and replacement of the internal components of the fixture including the ballast housing, ballast plate, fixture housing and lighting fixture should any of the latter become damaged or otherwise rendered inoperative. Finally, it will be appreciated by those skilled in the art that a process of installing a recessed lighting fixture in a concrete structure according to the present invention comprises the few above-described installation steps which may be carried out quickly and easily without the problems present in installing prior art recessed fixtures.

While the present invention has been set forth and described in detail for the purposes of making a full and complete disclosure of the subject matter thereof, the disclosure herein presented is not intended to be limiting in any way with respect to the scope of this invention as the same is set forth in the appended claims.

We claim:

1. A preform for forming a concrete structure having a fixture embedded therein, said preform comprising:
    a form board with an interior and an exterior surface;
    a stiffening member secured to the interior surface of said form board;
    a base housing secured to said form board and disposed over said stiffening member, said base housing having a generally cup-shaped or pan-shaped configuration with a closed end, one or more side walls, and an open end opposite said closed end and disposed over said stiffening member, said base housing having an interior region that is configured to receive therein components of said fixture; and
    a securing member disposed within the interior region of said base housing and extending from the closed end of said base housing to said form board, said securing member pulling said base housing toward said form board to secure said base housing to said form board in releasable fashion.

2. The preform of claim 1, in combination with cement disposed adjacent to said form board and surrounding said base housing exterior to said base housing.

3. The preform of claim 1, wherein said securing member comprises a rod having first and second ends, said rod extending through a first aperture located in the closed end of said base housing and a second aperture located in said form board.

4. The preform of claim 3, wherein said rod is a threaded rod, said first end is secured to said base housing by means of a nut secured to the first end of said rod, said first end being disposed exterior to said base housing, and said base housing is pulled toward said form board by means of a nut secured to the second end of said rod and bearing against an exterior surface of said form board located opposite said interior surface.

5. A method of forming a concrete structure containing a fixture embedded therein, said method comprising:
    securing a stiffening member to a first, interior surface of a form board;
    providing a base housing having a generally cup-shaped or pan-shaped configuration with a closed end, one or more side walls, and an open end opposite said closed end, said base housing having an interior region and an exterior region;
    removably securing said base housing to the interior surface of said form board with a securing member disposed within the interior region of said base housing and extending from the closed end of said base housing to said form board, said securing member pulling said base housing toward said form board to secure said base housing to said form board in releasable fashion, said open end of said base housing being disposed adjacent to said form board and said stiffening member when secured to the interior surface of said form board;
    subsequently pouring concrete, to form said concrete structure, such that concrete surrounds said base housing and embeds said base housing therein, said form board limiting the flow of concrete so as to define, at least in part, the final configuration of said concrete structure;
    subsequently removing said form board and said stiffening member from said concrete structure while leaving said base housing embedded therein; and
    subsequently installing components of said fixture within the interior region of said base housing.

6. The method of claim 5, wherein said stiffening member comprises a plate portion and one or more flange portions extending from said plate portion; said stiffening member is secured to said form board with said plate portion adjacent to the interior surface of said form board and said one or more flange portions extending away from the interior surface of said form board; and said base housing is secured to said stiffening member with said open end fitting over said one or more flange portions.

7. The method of claim 5, wherein said securing member comprises a rod having first and second ends and the step of securing said base housing to said form board further comprises:

passing said rod through a first aperture located in the closed end of said base housing from the exterior region of said base housing, through the interior region of said base housing, and through a second aperture located in said form board;

securing the first end of said rod to the closed end of said base housing to prevent said rod from passing entirely through said first aperture; and pulling said base housing toward said form board by pulling the second end of said rod through said second aperture.

8. The method of claim 7, wherein said rod is a threaded rod, said first end is secured to said base housing by means of a nut secured to the first end of said rod, and said base housing is pulled toward said form board by tightening a nut secured to the second end of said rod and bearing against an exterior surface of said form board, said exterior surface located opposite said interior surface.

9. The method of claim 5, further comprising removing said securing member from the interior region of said base housing after said removing said form board and said stiffening member from said concrete structure.

* * * * *